United States Patent [19]
Johnson

[11] Patent Number: 5,343,652
[45] Date of Patent: Sep. 6, 1994

[54] METHOD AND APPARATUS FOR LASER PEST CONTROL

[76] Inventor: W. Dudley Johnson, N128 W17741 Holy Hill Rd., Germantown, Wis. 53022

[21] Appl. No.: 898,012

[22] Filed: Jun. 12, 1992

[51] Int. Cl.⁵ .............................................. A01M 1/20
[52] U.S. Cl. .................................................... 43/132.1
[58] Field of Search ....................... 43/124, 134, 132.1, 43/138, 58, 133

[56] References Cited

U.S. PATENT DOCUMENTS

| | | | |
|---|---|---|---|
| 2,059,835 | 11/1936 | Worthing | 43/132.1 |
| 2,182,230 | 12/1939 | Hoffman | 43/132.1 |
| 4,127,961 | 12/1978 | Phillips . | |
| 4,349,980 | 9/1982 | McKee . | |
| 4,483,094 | 11/1984 | McKee . | |

FOREIGN PATENT DOCUMENTS

| | | | |
|---|---|---|---|
| 3825389 | 2/1990 | Fed. Rep. of Germany . | |
| 1202233 | 2/1988 | Japan . | |
| 0758315 | 8/1980 | U.S.S.R. | 43/134 |

OTHER PUBLICATIONS

JS&A catalog, 1978, p. 30.

Primary Examiner—Kurt C. Rowan
Attorney, Agent, or Firm—Foley & Lardner

[57] ABSTRACT

The invention provides an apparatus and a method for controlling pests which, according to one aspect of the invention, uses a laser beam which is scanned over a defined area and incapacitates sensory organs of various pests when they enter the defined area. Such a pest control system uses a laser source in cooperation with a scanner which then repetitively scans the laser beam throughout the defined area. Any pest which wanders into this area, or is attracted into this area, is likely to sense the laser beam, typically through its eyes or light spot. The laser beam is of sufficient energy to destroy the sensory organ and incapacitate the pest.

20 Claims, 2 Drawing Sheets

METHOD AND APPARATUS FOR LASER PEST CONTROL

TECHNICAL FIELD

This invention relates to pest control, more particularly to use of a concentrated energy source such as a laser beam to exterminate pests.

BACKGROUND OF THE INVENTION

Control of pests such as insects has evolved from hand slaps to fly swatters to chemical insecticides, electric bug traps, glue covered strips, and other devices. Often an attractant, such as an ultraviolet light, scent or edible bait, is used to lure insects or rodents into the trap. See, for example, Phillips, U.S. Pat. No. 4,127,961, issued Dec. 5, 1978. In one common trap, an ultraviolet light attract insects onto an electrified grid which then electrocutes the insects. This device, however, sparks loudly, spatters debris, and is dangerous to humans. Mechanical traps also have drawbacks, for example, the need to lure the pest into a small space. Chemical pesticides can poison non-target species and pollute the environment.

Energy devices such as lasers have been proposed for use against insect pests. Lasers exist in several classes ranging from small, harmless beams to extremely intense beams usable as long range weapons. Japanese Patent No. 1-202,233 suggests use of a handheld laser to kill ticks, fleas and other household insects. German Patent Publication No. 3,825,389 proposes use of a laser or sound beam against flying swarms of locusts. The latter method recognizes that destroying the insects completely would require too much energy, and therefore targets a specific organ structure such as wings or sensory organs to render the insects unable to fly. Even so, the energies described are too large for practical use using the method suggested.

Like insect control, rodent and mouse control has a long history ranging from the common mousetrap to devices that use striking bars to incapacitate the rodent when it passes by; see McKee, U.S. Pat. No. 4,349,980, issued Sep. 21, 1982 and McKee, U.S. Pat. No. 4,483,094, issued Nov. 20, 1984. Poison bait pellets have also long been used to exterminate rodents. The poisoned pellets are typically scattered or placed on the ground and attract rodents looking for food.

Pest control problems are not confined to land. Recently, the Zebra mussel has invaded the Great Lakes. This creature is microscopic in its larval form and is readily drawn into water treatment plants through intake pipes. It attaches itself to a smooth surface, such as a pipe wall, and there grows over the course of two years to about a centimeter long. Huge numbers of the mussels grow together in the same location, forming a colony. The Zebra mussel's hard striped shell remains permanently attached, eventually clogging the water intake and requiring an extremely difficult, expensive cleaning operation. As a result, water plants on the Great Lakes are installing chemical and thermal Zebra mussel control systems. The former can involve release of chlorine into the lake at the intake site, a potential hazard to the lake environment. Heating or cooling lake water on a continuing basis can similarly have damaging effects on local ecosystems.

Marine pests are particularly difficult to deal with because it is hard to selectively destroy a target pest underwater without damaging the environment. The present invention addresses a number of the problems associated with conventional pest control, and further provides a method for controlling underwater pests.

SUMMARY OF THE INVENTION

The invention provides a method for exterminating pests by directing a beam of electromagnetic radiation, particularly light, most preferably laser light, against the pest. The beam preferably has a power and wavelength sufficient to blind or otherwise incapacitate the pest without immediately killing it. Even power ratings of from about 0.1 watt up to (but less than) 10 watts are effective for this purpose.

One specific method of the invention involves repetitively scanning a location frequented by pests using an automatic laser scanning system. This can provide continuous pest control in an infested area without use of mechanical traps or chemicals and without need for a human operator. An apparatus suitable for use in such a method comprises a source of a laser beam capable of killing or harming the target pest, a scanner capable of directing the laser beam produced by the source within a scanned area to contact the pest, and an attractant disposable in order to lure the pests into the area scanned. This embodiment is most suited for use in remote areas so that accidental exposure of a human or non-target animal can be avoided.

A method for agricultural pest control of the invention which involves scanning a crop field with a laser beam having a power and wavelength sufficient to blind, harm or kill crop destroying pests present in the field without substantially harming the crop plants growing in the field. The laser can be conveniently mounted on a farm implement so that a laser having a limited scanning range can be systematically drawn over a large territory at close range. An apparatus suited for use in such a method comprises a vehicle, particularly a farm vehicle, having a laser beam projector mounted thereon. The laser can either scan an area near the vehicle as the vehicle moves along, or one or more broad divergent laser beams can be used.

A method for exterminating underwater pests according to the invention comprises directing a laser beam against the pest beneath the water. The laser must have an energy level and wavelength sufficient to penetrate water and kill or harm the pest. An underwater structure can be protected from underwater pests by directing the laser beam to cover a zone surrounding the structure. Underwater pests entering the zone are killed or harmed sufficiently to prevent infestation of the structure. Such a method can be used to prevent Zebra mussel infestation of water intake pipes and related facilities with minimal disruption of marine ecology.

The invention further provides a trap for exterminating common house and garden pests, especially flying insects. Such a trap includes a housing having an interior chamber and an opening through which the target pests can enter the chamber, and a source of a laser beam disposed within the housing. The beam is capable of killing or harming the target pests that enter the chamber, but is preferably oriented so that the amount of laser light emitted from opening(s) of the housing is sufficiently small to be non-harmful to humans and higher animals. These and other aspects of the invention are set forth in detail in the description that follows.

BRIEF DESCRIPTION OF THE DRAWINGS

The invention will hereafter be described with reference to the accompanying drawings, wherein like numerals denote like elements, and.

DETAILED DESCRIPTION OF PREFERRED EMBODIMENTS

Figure 1:
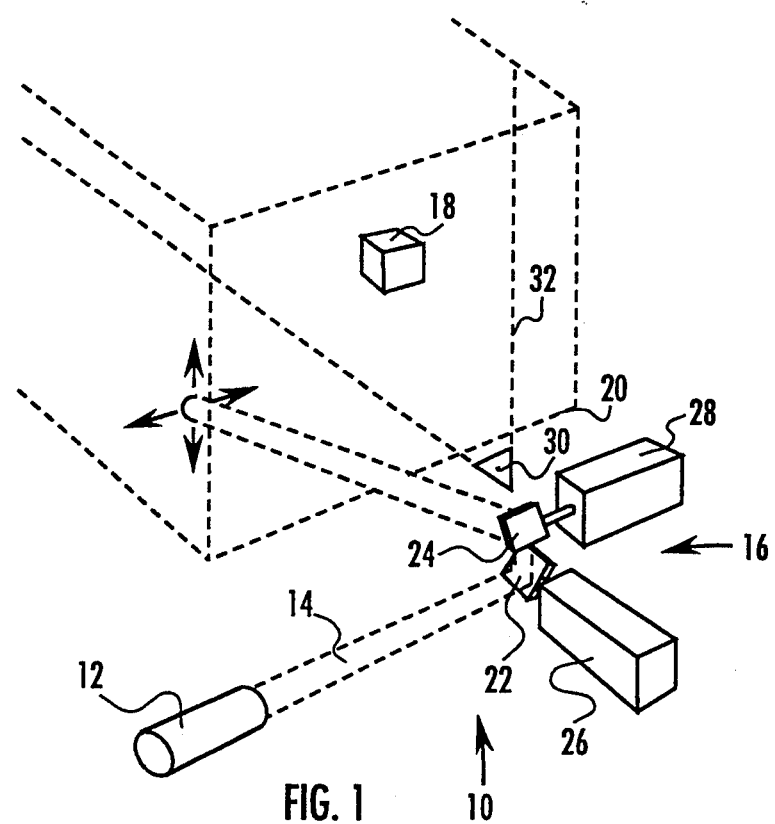
FIG. 1 is a schematic diagram of a laser scanning method and apparatus according to the invention.

Lasers have been used in many applications because of their ability to align light waves so that the light is collimated and coherent and the energy remains concentrated. These qualities allow lasers to be used in numerous applications ranging from the cutting of metal to the performing of delicate surgical operations. In accordance with the invention, the unique qualities of laser beams, optionally in conjunction with the rapid reorientation of the beam through the use of a controlled scanner, provide a system effective for destruction of sensory systems, particularly the visual organs, of pests.

The invention uses light, particularly laser light, to control a variety of pests while avoiding danger or damage to other creatures and the surroundings. In particular, certain relatively low-power lasers are destructive to sensory organs, particularly the eyes, of insects and other pests. According to the invention, a laser beam is directed towards a particular spot or scanned throughout a predetermined area to incapacitate one or more types of pests, for example, grasshoppers. The laser beam strikes the insect's multi-faceted eyes, and the eyes are damaged or destroyed, blinding the insect. The blinded insect is effectively incapacitated and soon dies. A blind grasshopper, for example, may remain immobile until it dies.

Different eyes have various levels of moisture and include different types of tissue, requiring the selection of a laser which will not reflect or pass through the eye without destroying the effectiveness of the eye. Insects are particularly vulnerable to laser beams because their multi-faceted eyes are capable of picking up light from a variety of directions regardless of the orientation of the insect's body.

A $CO_2$ laser having a wavelength of 10.6 microns is absorbed by water, whereas a neodymium-YAG laser having a wavelength of 1.06 microns is transmitted through water. Insect eyes are typically very dry with a mosaic of compartments, whereas the eyes of a human being or higher animal contain a large quantity of water. Thus, a $CO_2$ laser can be adjusted to a power level sufficiently low to blind an insect without blinding a human being. Laser exposure limits for the human eye vary widely depending on the wavelength of the laser. For example, for an argon laser having a wavelength of 488 or 514.5 nm, the ocular exposure limit for humans is 0.5 $\mu J/cm^2$ for exposures of 1 nanosecond to 18 microseconds, whereas for a $CO_2$ laser at 10.6 $\mu m$ the comparable limit is 10 $mJ/cm^2$ for exposures of 1–100 nanoseconds. See generally the *Laser Safety Guide*, Laser Institute of America, Table 2 at page 10, the contents of which are incorporated herein by reference.

Since laser damage to an eye or organ of a pest will vary depending on many different parameters, including laser power level, exposure time, wavelength, and the absorption/reflection characteristics of the target and the medium through which the beam must pass to reach the target, the conditions needed to practice the invention will vary widely depending on the specific application. Exposure time in turn depends on the scanning speed and beam diameter. A Q-switched laser, which could be used in the invention, delivers a huge energy over a very short time, might do more damage to an eye structure than a lower power laser acting over a longer period delivering the same total energy. Total energy delivered to the target does not by itself determine the extent of damage. However, persons skilled in the art can readily determine through routine experimentation a variety of different sets of conditions in which lasers can be used in accordance with the invention.

As discussed further below, pests that can be exterminated according to the method of the invention includes virtually all common pest types, including invertebrates such as insects, marine creatures such as mussels, and even mammals such as rodents. By choosing the type of light having appropriate parameters for the destruction of the eyes or other sensory organs (such as antennae) of a particular pest, the pest can be most efficiently incapacitated with reduced danger to non-target species. The parameters include the wavelength of the light, the level of absorption of laser light by the eyes of the pest, and the duration of exposure to the light. The latter depends on the scanning rate and beam width, which determine how long the beam hits the eye or target organ, and also on whether or not the laser is pulsed or continuous. At relatively low power levels of 2 to 10 watts, an exposure duration of about 1 second or longer is needed to blind a typical insect or rodent pest. If a higher power level is used, the needed exposure time decreases.

In one aspect of the invention, a laser beam is directed throughout an area so that a particular pest within the area can be exterminated without harming the surrounding foliage or environment. An attractant can be used to encourage more pests into the vicinity of the stationary or sweeping laser beam. Use of an attractant allows the laser beam to be directed or scanned over a much smaller or more defined area as may be appropriate in certain applications.

Referring to FIG. 1, a pest control system or apparatus 10 in accordance with the invention comprises a laser source 12 which produces a laser beam 14, a scanner 16 that directs beam 14 according to a predetermined, repetitive pattern, and an attractant 18 disposed in a target area 20. Scanner 16 includes a pair of reflectors (mirrors) 22, 24 rotatable on axes set at right angles to each other. Associated drive units 26, 28 pivot each mirror 22, 24 in accordance with the programmed pattern. Beam 14 reflects off of mirrors 22, 24 in succession such that pivoting of mirrors 22, 24 causes beam 14 to move in both X and Y directions. The pattern may comprise a conventional raster scan.

In the event that rodents or other pests become wary of the trapped area, or visitation of the infested area by the pests becomes infrequent, a commercially available motion sensor 30 or similar detection device (e.g., a weight-sensitive floor pad) could be connected to system 10 so that the system 10 shuts down if no motion is detected in target area 20 and restarts once motion is detected. A suitable delay may be provided between detection of movement and activation of system 10 to allow rodents or other pests to enter the target area and approach attractant 18. In the alternative, sensor 30 can cover a smaller sub-space 32 within target area 20, the smaller space preferably being centered on the attractant 18. With or without sensor 30 or its equivalent, system 10 can function automatically (without need for a human operator) even in a remote or confined location inaccessible to humans.

Beam 14 may be continuous or pulsed. Laser source 12 may be any type of commercially available laser of sufficient power, such as a $CO_2$, Nd-YAG, Nd-glass, helium-neon, ruby, aluminum-gallium-arsenide, dye, helium-cadmium, krypton, or KTP-YAG laser. Wavelengths for these known lasers vary from about 0.4 to 10.6 microns, but wavelengths outside this range, for example, all infrared, visible and ultraviolet light, could also be employed. Depending on the type of pest, the power level of laser source should be at least about 2 watts for animals such as rodents, and at least about 0.1 watt for insects and other small or microscopic creatures such as mussel larvae as discussed below. For the former, a range of from 2 watts to as high as 1000 watts, more generally 2 to 100 watts, is preferred. Power levels above 100, especially 1000 watts are effective to destroy pests, but are dangerous and inefficient, and can damage surrounding objects. For purposes of the invention, power level in watts as discussed herein refers to the average power per $cm^2$ delivered to the target. Lasers of all wavelengths in the range of from 0.1 to 10 watts are preferred against insects and other small creatures because these relatively low power levels are effective for blinding insects with minimal energy consumption.

Scanner 16 may be a commercially available moving mirror imaging unit such as those of the LK series available from General Scanning, Inc, or a unit driven by an oscillator or function generator such as the Model 3020 Sweep/Function Generator made by Dynascan Corporation. Accessories that focus the beam to a spot may be used to maintain a desired beam diameter throughout the target area. A lens or equivalent device, such as a combination of curved mirrors, may be used to cause the beam to diverge (widen) with increasing distance.

Scanner 16 may move beam 14 back-and-forth in a single direction, e.g., with only one moving mirror, or may rapidly vector or direct beam 14 throughout a coordinate plane as shown. Scanner 16 is controlled by various methods known to those skilled in the art including function generators, oscillators, computers, etc. which are capable of providing accurate and rapid redirecting of laser beam 14.

Scanning speed will depend on other factors such as beam diameter and intensity and the specific target pest, and is generally selected so that if beam 14 passes over the eyes of an immobile target pest, the duration of exposure to the beam will be sufficient to blind the pest. The beam scanning speed is not critical and may vary widely depending on the other factors. A scanning speed of 300 Hertz (cycles per second) is typical, with speeds up to 1 KHz or more possible. Slower speeds of less than 1 Hz may be desirable in some circumstances.

Attractant 18 may take a variety of forms. In general, anything that is effective to lure the target pests into the scanned area can be used, such as an ultraviolet light source, which attracts a variety of insects. Other possible attractants include an incandescent or fluorescent light, sound generator, pest hormone, odor generator, an object with a specific color, and a bait such as food.

When pest control system 10 is turned on, laser beam 14 repetitively scans target area 20, either continuously or intermittently. Alternatively, a sufficiently powerful diverging beam could be used instead to cover the entire target area simultaneously from a fixed position, either constantly, intermittently or in response to movement detected by sensor 30 within the target area. In any of these embodiments, an insect, rodent or other pest entering the target area encounters the laser beam and is blinded. The pest is then unable to fend for itself and will eventually die. For purposes of the invention, "exterminating" a pest refers both to direct destruction of the pest using a laser beam and also to indirect destruction by injuring the pest to the point that it cannot survive.

The laser wavelength and energy level may need adjustment for each situation depending on the type of pests to be exterminated and the range of the pests from the laser source in order to most effectively exterminate a specific pest without environmental damage. Further, as noted above, incapacitation according to the invention can also be carried out against other pest sensory organs, such as antennae, or even against wings in order to render a flying insect unable to fly.

The pest control system 10 may be adapted for use in enclosed environments. Such environments include warehouses, elevators, basements, sewers, greenhouses and other environments where pests reside.

Figure 2:
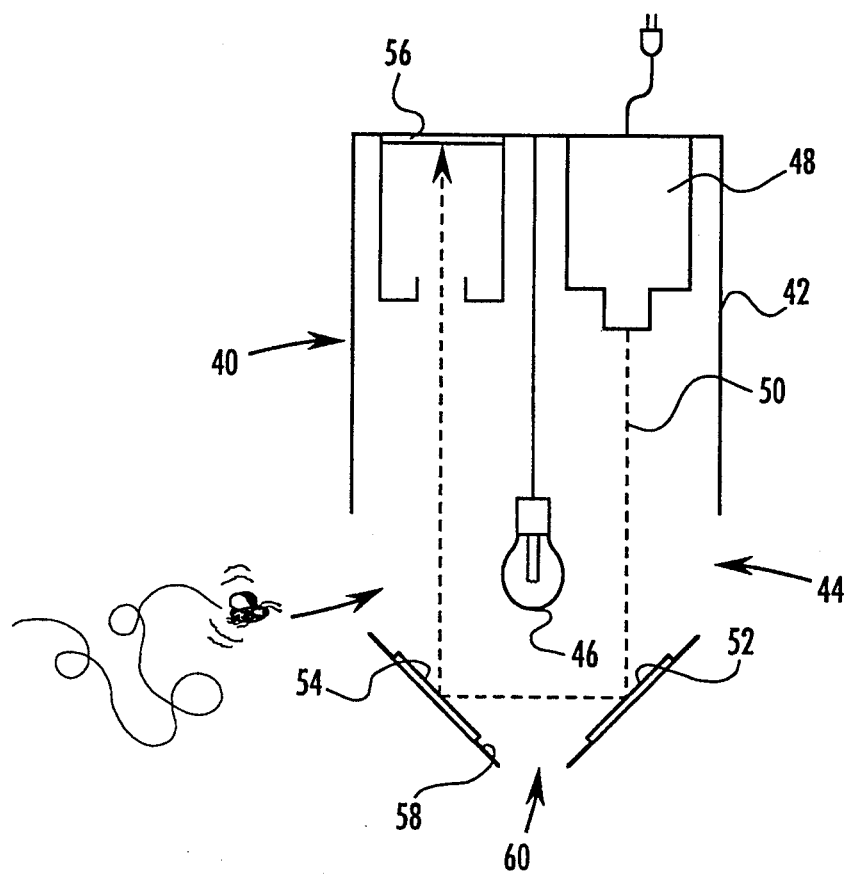
FIG. 2 is a schematic diagram of a trap according to the invention.

Referring to FIG. 2, a trap 40 according to the invention can be used in locations for which a laser scanning system would be dangerous or inconvenient. Trap 40 includes a sturdy, preferably opaque housing 42 having one or more openings 44 therein sized to allow insects or other pests to enter. An attractant, such as a light bulb 46, is positioned within the housing in order to induce insects to enter through openings 44. A laser source 48 mounted inside housing 42 produces a laser beam 50 that blinds or destroys insects after they have entered through openings 44.

Laser source 48 is preferably positioned so that the laser beam 50 does not exit or reflect out of housing 42. For example, beam 50 can be redirected through use of angled mirrors or reflectors 52, 54 so that its path covers a greater portion of the interior of housing 42. Beam 50 then enters a baffled absorber 56 which absorbs and dissipates the beam in such a manner that little or no laser light escapes from housing 42.

Trap 40 permits use of a laser that might otherwise be hazardous to humans or higher animals. If the laser used is not hazardous to humans or non-target species, mirrors 52, 54 and/or absorber 56 can be omitted. Trap 40 may optionally have suitable means, such as sloped bottom walls 58 leading to a bottom hole 60, or simply an open bottom, whereby dead or injured insects fall out of the trap to the ground below, reducing the need to clean the trap after use. In this manner, trap 40 provides a less cumbersome alternative to conventional electrical insect traps.

Figure 3:
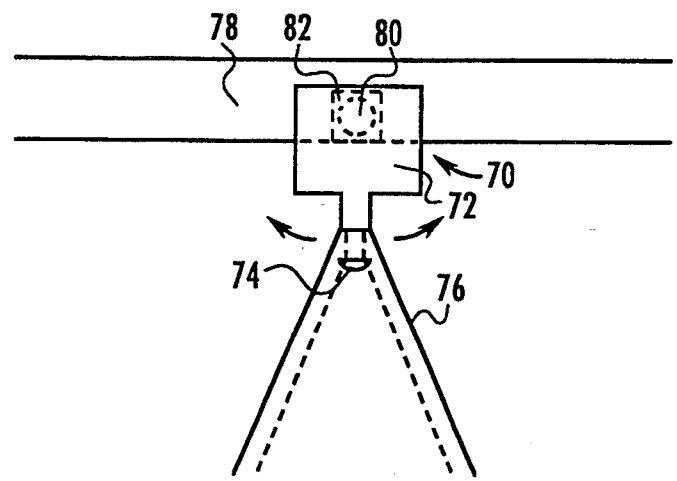
FIG. 3 is a schematic diagram of an exemplary divergent laser beam scanner according to the invention.

FIG. 3 illustrates a laser projector 70 according to the invention adapted for use in the method for agricultural pest control of the invention. Projector 70 includes a laser source 72, a beam widening lens 74 that causes the beam from laser source 72 to diverge to cover a larger area, and a cone-shaped shade 76 for minimizing leakage of laser light in directions other than the desired downward direction. Projector 70 may, for example, be mounted on a crossbar or similar member 78 of a farm vehicle (e.g., a tractor) or a trailer for such a vehicle.

Projector 70 bathes crops in laser light as the vehicle passes through the field, simultaneously cultivating or delivering a fertilizer to the field. An axle 80 and pivoting drive unit 82 may be provided so that projector 70 swings from side-to-side, covering a larger area as the vehicle moves forward. Use of a relatively low powered laser source 72 in this manner can permit destruction of crop-destroying pests present in the field without substantially harming the crop plants growing in the field. The laser power level to destroy insect or rodent eyes is much less than the level needed to injure some kinds of vegetation.

Figure 4:
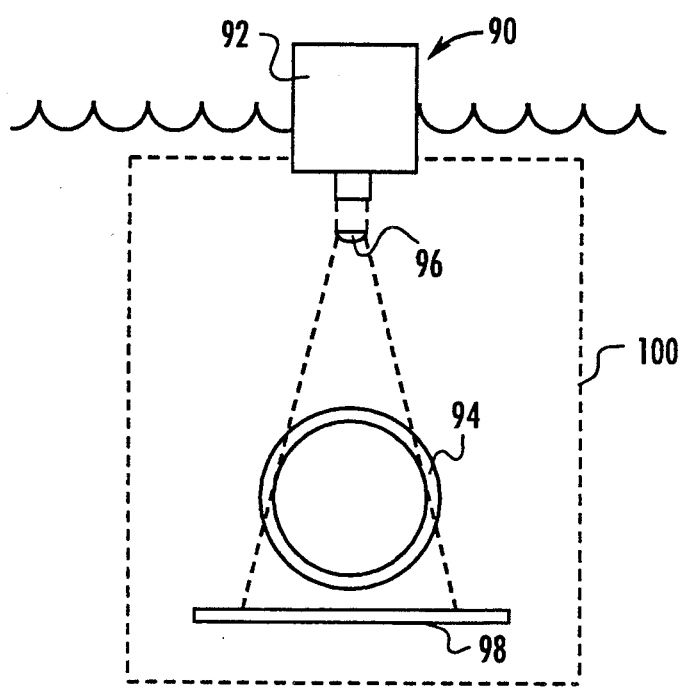
FIG. 4 is a schematic diagram of an apparatus for protecting an underwater structure according to the invention.

FIG. 4 illustrates a laser apparatus 90 for protecting an underwater structure according to the invention. A laser projector 92 that produces a diverging beam by means of a lens 96 is positioned adjacent the open end of a submerged water intake pipe 94 of a water treatment or other facility or on the intake pipes of ships or boats. Laser projector 92 operates continuously or intermittently and has a wavelength suitable for propagation through water for at least the width of the opening at a power level effective to injure or destroy the marine pests. The laser is one such as a Nd-YAG laser, but not a $CO_2$ laser. A laser absorbing shield 98 may be provided on the opposite side of the intake from projector 92 to confine the laser beam to the desired area insofar as possible.

Encrustation of Zebra mussels begins when the microscopic larval form enters the intake pipe from a lake, ocean or other naturally occurring body of water and attaches itself to the pipe wall or an interior surface within the treatment plant. Apparatus 90 destroys the mussel larvae as they float through the laser beam on their way into the pipe. The larvae have a light-sensitive spot that is particularly vulnerable to laser light. The larvae also have other laser light-sensitive areas such as the intestinal tract. In this manner no living larvae can enter the intake, and removal of encrusted masses of mussel shells never becomes necessary.

A cage or porous container 100 may be provided about the intake opening to prevent swimmers, fish and marine life from coming in contact with the laser. A pulsed laser beam can produce an impact noise or an electrical breakdown (spark) which might also contribute to repelling unwanted marine creatures. A fiber optic element can be used to transmit the laser beam from the laser source to the location to be protected, such as within a pipe or tank. In this manner several laser scanning points could be established within the same pipeline to make sure that no living larvae enter the plant.

An underwater laser can also be used for other pest control purposes. For example, the hulls of ships can be periodically laser-treated in order to prevent encrustation by Zebra mussels and other sea creatures.

The foregoing are only a few of the many possible environments in which these pest control methods and systems of the invention might be used. It will be understood that the foregoing description is of preferred exemplary embodiments of the invention, and that the invention is not limited to the specific forms shown. For example, in some instances forms of light or electromagnetic radiation other than lasers may provide equivalent effects. These and other modifications may be made in the design and arrangement of the elements without departing from the scope of the invention as expressed in the appended claims.

I claim:

1. A method for automatic extermination of pests which comprises:
   (A) placing an automatic laser scanning system in a target location frequented by the pests;
   (B) scanning the target location according to a predetermined scanning pattern with a laser beam having an intensity sufficient to exterminate the pests;
   (C) repeating step (B) multiple times so that the target location is repetitively scanned;
   (D) detecting whether or not a pest is present in the target location using an automated sensor;
   (E) ceasing scanning if no pest is detected in step (D); and
   (F) resuming scanning when a pest is detected in the target location by the sensor.

2. The method of claim 1, further comprising placing an attractant in the scanned location frequented by pests in order to lure the pests into the scanned location.

3. The method of claim 4, wherein the attractant is selected from a light, a sound generator, a food bait, and a non-food odor generator.

4. The method of claim 1, wherein the scan comprises a raster or vector scan.

5. The method of claim 1, wherein the laser beam has a wavelength in the infrared, visible or ultraviolet range and has a power in the range of about 2 to 1000 watts.

6. The method of claim 1, wherein the pest is an invertebrate.

7. The method of claim 6, wherein the invertebrate is an insect.

8. The method of claim 1, wherein the pest is a rodent.

9. The method of claim 1, wherein the predetermined pattern is the same for each scan of the target location.

10. The method of claim 1, wherein step (C) further comprises intermittently scanning the target location.

11. The method of claim 1, wherein step (D) further comprises detecting motion in the target location using a motion sensor.

12. The method of claim 1, wherein the target location is an indoor location.

13. A method for automatic extermination of pests which comprises:
   (A) placing an automatic laser scanning system in a target location frequented by the pests;
   (B) scanning the target location according to a predetermined scanning pattern with a laser beam having an intensity sufficient to exterminate the pests;
   (C) repeating step (B) multiple times so that the target location is repetitively scanned;
   (D) detecting whether or not a pest is present in the target location using an automated sensor;
   (E) ceasing scanning if no pest is detected in step (D); and
   (F) resuming scanning following a delay period after a pest has been detected in the target location.

14. A trap for exterminating pests, comprising:
   a housing having an interior chamber and an opening through which the target pests can enter the chamber; and
   a source of a laser beam disposed within the housing, which beam is capable of killing or harming the target pests that enter the chamber.

15. The trap of claim 14, wherein the laser source is oriented within the housing so that the amount of laser light emitted from the opening of the housing is sufficiently small to be non-harmful to humans and higher animals.

16. The trap of claim 14, wherein the housing has means for permitting a dead or disabled insect to fall out of the trap.

17. A method for automatic extermination of pests which comprises:

placing an automatic laser system in a target location frequented by the pests;

detecting whether or not a pest is present in the target location using an automated sensor; and automatically radiating the target location with a laser beam having an intensity sufficient to exterminate the pests whenever a pest is detected in the target location.

18. The method of claim 17, wherein the laser beam is a diverging beam that simultaneously covers the entire target location.

19. The method of claim 17, wherein the laser beam is a narrow beam, and the radiating step further comprises scanning the target location with the laser beam.

20. The method of claim 17, wherein the detecting step further comprises detecting motion in the target location using a motion sensor.

* * * * *